United States Patent [19]

Toll et al.

[11] 4,150,286
[45] Apr. 17, 1979

[54] MATERIAL FLOW MONITORING CIRCUIT

[75] Inventors: Keith A. Toll, Delta; Philip B. Handfield, Pointe Claire, both of Canada

[73] Assignee: The Babcock & Wilcox Company, New York, N.Y.

[21] Appl. No.: 842,211

[22] Filed: Oct. 17, 1977

[51] Int. Cl.² ............................................. G01D 21/04
[52] U.S. Cl. ............................. 250/206; 250/214 DC; 250/215; 250/223 R
[58] Field of Search ............... 250/223 R, 223 B, 206, 250/564, 565, 214 DC, 215

[56] References Cited

U.S. PATENT DOCUMENTS 3,163,176   12/1964   Darling ........................... 250/565 X
3,225,963   12/1965   Arpajian ....................... 250/223 R X

FOREIGN PATENT DOCUMENTS 280016   3/1965   Australia ............................... 250/223 R Primary Examiner—Siegfried H. Grimm
Attorney, Agent, or Firm—Vytas R. Matas; Joseph M. Maguire

[57] ABSTRACT

An electrical circuit assembly is provided for monitoring the flow of particulate fuel material in a chute having window areas on opposite sides thereof. The circuit assembly emits a light at one window end of the chute which is received at the opposite window end of the chute by a circuit assembly. The condition of the received light is dependent upon fuel material flow in the chute. If the flow is normal the emitted light will be intermittently interrupted by the particulate material resulting in chopped light being received by the circuit. If the chute is blocked downstream the chute will be filled with material and there will be no light received by the circuit. Similarly, if the blockage is upstream the chute will be empty and an uninterrupted light will be received. The circuit analyzes these received light conditions and produces output signals indicative of the mentioned fuel flow conditions.

8 Claims, 3 Drawing Figures

MATERIAL FLOW MONITORING CIRCUIT

BACKGROUND OF THE INVENTION

1. Field of the Invention

The present invention generally relates to particulate material flow monitoring assemblies and particularly to particulate material flow monitoring assemblies which indicate not only proper fuel flow in a chute but upstream and downstream chute blockage conditions.

2. Description of the Prior Art

Certain boilers especially in saw mills are fueled by particulate fuel materials such as wood, sawdust and bark chips. Such fuel is known as hogged fuel. Generally the hogged fuel is fed from conveyors into inclined chutes leading to the boiler. At the conveyor end of the chute a paddle wheel or other control feeder arrangements feed the hogged fuel into the chute while another paddle wheel or other fuel distributor arrangement at the opposite end of the chute feeds the hogged fuel into the boiler. Because of the moisture content of the hogged fuel, sometimes 65%, the particulate material tends to lump together and clogs either the upstream conveyor paddle wheel or the downstream boiler feed paddle wheel. Thus the condition of the chute had to be monitored to insure that proper hogged fuel flow is maintained to the boiler.

Prior art monitoring included the placement of a window in the chute through which an operator visibly checked chute conditions. Light sources and receiver-detectors were also placed at opposite window ends of the chute and the intensity of the light was monitored by the receiver to determine proper fuel flow. However, the light detectors produced a D.C. signal proportional to the amount of light that was transmitted. Over a period of time the windows through which the light shines tended to get dirty and consequently the D.C. level would drop and get to a point below the alarm point of the D.C. detector setting off a false alarm condition.

Thus what was needed was an automatic hogged fuel monitoring assembly which would not be affected by dirty chute windows and which would provide a signal indicative of proper chute fuel flow and upstream and downstream chute blockage conditions.

SUMMARY OF THE INVENTION

The present invention solves the mentioned prior art problems as well as others by providing an A.C. flicker detecting circuit at a side of the chute opposite a light source to detect the flickering transmission of the light source as it is interrupted by particulate material flowing in the chute. As such the continuous or D.C. level of the originating light signal is ignored by the circuit and only the flickering or A.C. level is used to indicate proper fuel flow. Thus the dirty condition of the windows changing the D.C. signal level do not affect the monitoring circuit.

The monitoring circuit is also responsive to a completely interrupted light signal as well as to a completely uninterrupted light signal and establishes two distinct control signals in response thereto. Since an upstream chute blockage will produce an empty chute and an uninterrupted bright light source while a downstream chute blockage will produce a filled chute and an uninterrupted minimum light source the circuit will also indicate upstream or downstream chute blockage.

Thus one aspect of the present invention is to provide a monitoring circuit for particulate material flow in a chute which will be independent of the window conditions of the chute.

Another aspect of the present invention is to provide a particulate material monitoring circuit which will indicate an upstream or a downstream blockage of material flow in a chute.

These and other aspects of the present invention will be more fully understood after consideration of the following description of the preferred embodiment when considered with the accompanying drawings.

DESCRIPTION OF THE PREFERRED EMBODIMENT

Figure 2:
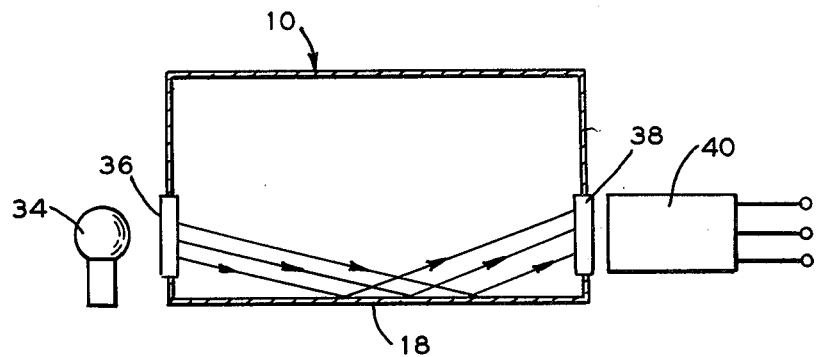
FIG. 2 is a front view of the FIG. 1 assembly.
Figure 1:
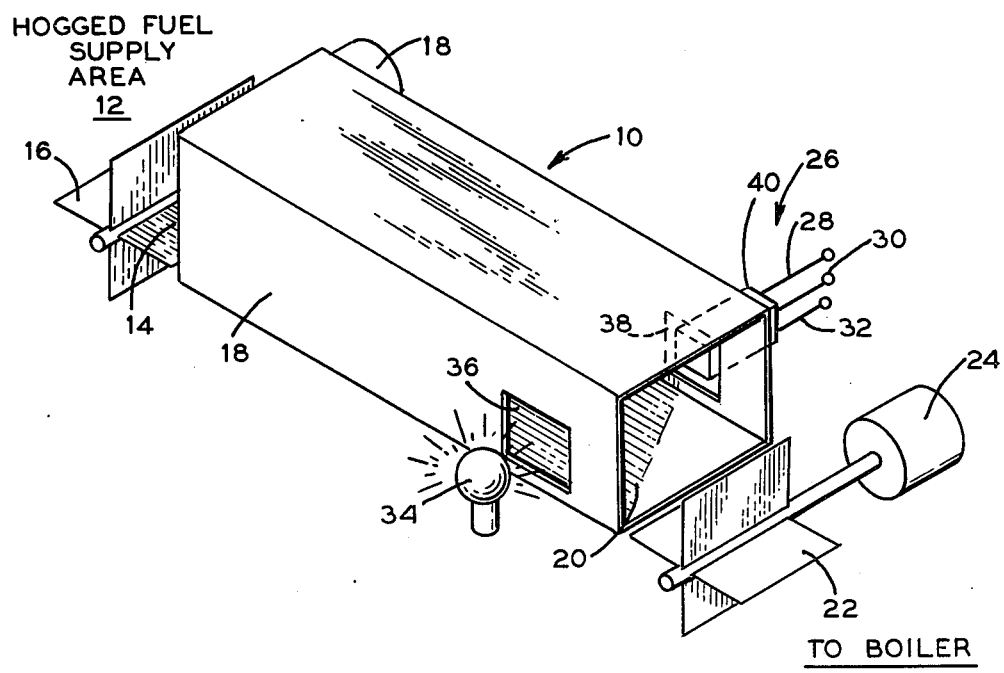
FIG. 1 is a perspective drawing of the monitoring assembly of the present invention mounted on a chute for passing particulate material therethrough.

Referring now to the drawings, FIGS. 1 and 2 show an inclined chute 10 which is mounted between a hogged fuel supply area 12 and a boiler (not shown) which is used to convey hogged fuel from the hogged fuel supply area 12 for burning in the boiler. Hogged fuel is a mixture of particulate wood, bark and sawdust readily found in saw mills and is used by saw mills to fuel their boilers. The hogged fuel is conveyed to the supply area 12 by conveyors and is moved from the area 12 into an inlet 14 of the chute 10 by a paddle wheel 16 rotated by a motor 18. The hogged fuel moves along a bottom 18 of the inclined chute 10 under the influence of gravity and is fed from an outlet 20 of the chute 10 to the boiler by a second paddle wheel 22 rotated by a motor 24. Usually a number of such chutes are used to fire one boiler but for purposes of illustrating the invention the one chute 10 is used and it will be understood the other chutes are mere duplications.

Because of the high moisture fuel sizing or species content of hogged fuel (65%) lumps of material are formed and the hogged fuel flows intermittently along the bottom 18 of the chute 10. The hogged fuel may also clog either the inlet 14 paddle wheel 16 or the outlet 20 paddle wheel 22 preventing hogged fuel flow to the boiler. Continuous operation of the paddle wheels 16 and 22 under such conditions may overload or jam the motors 18 and 24 causing them to burn out. Thus a monitoring circuit assembly 26 is provided which has three output signal lines 28, 30, 32 providing control signals indicative of proper hogged fuel flow, upstream blockage and downstream blockage. These control signals may be used to automatically shut down the motors 18 and 24 during blockage conditions as well as provide indications of operation to a central control room.

The chute monitoring assembly 26 includes an incandescent light source 34 mounted on one side of the chute 10 proximate to a transparent window 36 cut therein. The light source 34 shines its light on the reflective polished steel bottom 18 of the chute 10 and is reflected therefrom into another transparent window 38 cut into the opposite side of the chute 10. During normal hogged fuel flow in the chute 10 the reflective bottom 18 is intermittently covered by lumps of the non-reflective hogged fuel resulting in intermittent reflections of the light from the light source 34 to reach the window 38. During a blockage of the paddle wheel 16, no hogged fuel is able to flow along the reflective bottom 18 and a continuous reflective light is provided to window 38. A blockage of paddle wheel 22 will cause hogged fuel to be packed into the chute 10 by the paddle wheel 16 until no reflected light reaches window 38. A monitoring circuit 40 is mounted proximate to the window 38 which responds to the forementioned reflected light conditions to establish control signals along lines 28, 30, and 32 indicative of the conditions.

Figure 3:
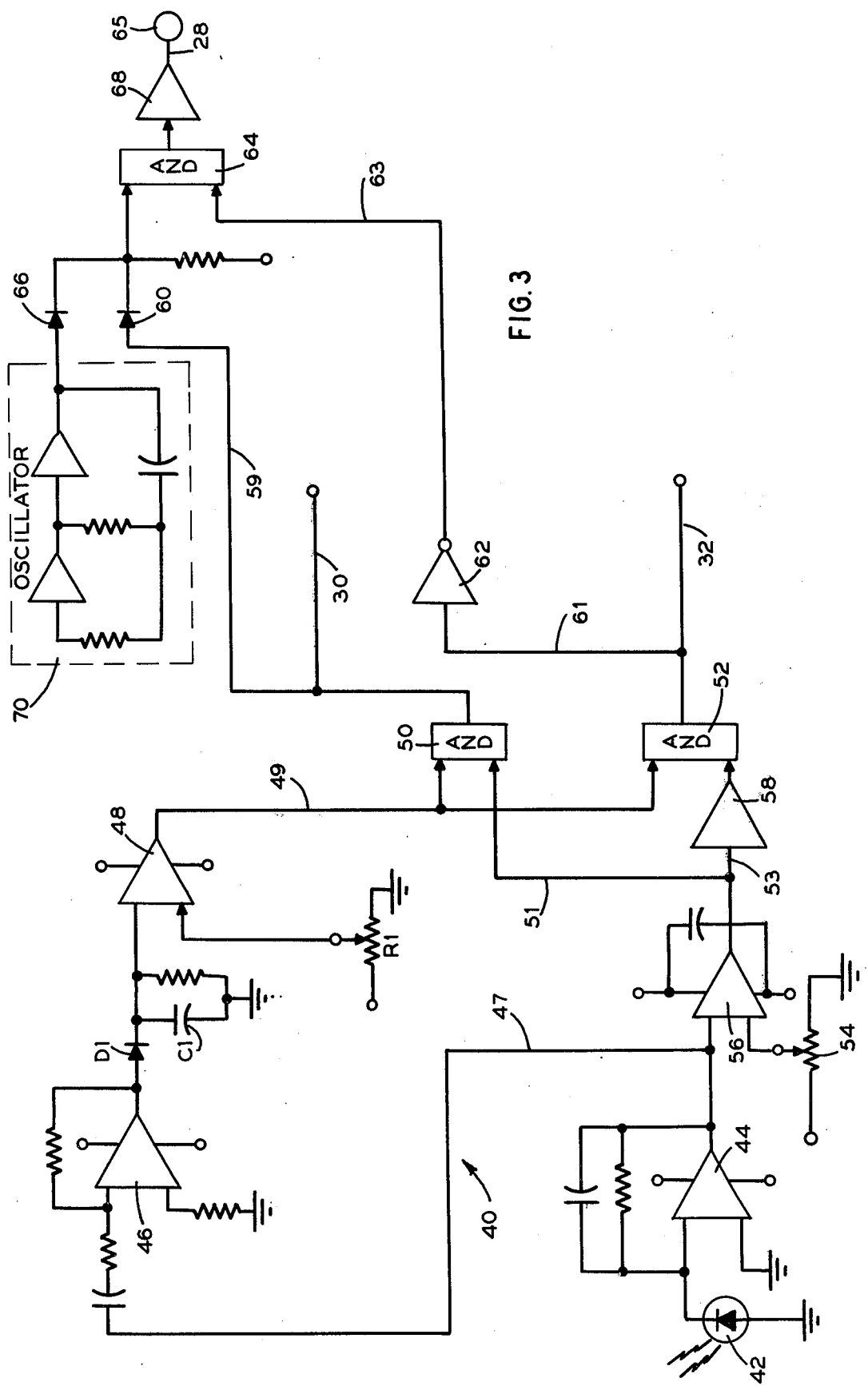
FIG. 3 is a schematic of the monitoring circuit of the present invention.

Referring now to FIG. 3, it will be seen that the monitoring circuit 40 has a light detector 42 which establishes an electrical output signal in response to light received by the detector 42 from the light source 34. The signal from the detector 42 is processed by the accompanying circuitry to then establish the control signals along lines 28, 30, 32. Irrespective of the signal received by the detector 42, the electrical signal from the detector 42 is amplified by a D.C. amplifier 44 to increase the detector 42 output signal to a usable level. The output of the amplifier 44 is then fed in parallel to two electrical circuits; one for monitoring and indicating proper hogged fuel flow conditions and the other for monitoring and indicating chute blockage conditions.

Under proper hogged fuel flow conditions, the light from source 34 is constantly interrupted by hogged fuel flow resulting in flickering light being received by the detector 42. The flickering light establishes an A.C. signal from the detector 42 which is amplified by amplifier 44 and is fed to an A.C. amplifier 46 along line 47 where the D.C. level of the signal is removed and the flickering A.C. component of the signal is further amplified. The output of the amplifier 46 is then applied from amplifier 46 to a diode D1 and capacitor C1 combination. The combination of the diode D1 and capacitor C1 causes the capacitor C1 to stay charged up to some positive voltage value as long as a flickering or A.C. signal exists from detector 42. This flickering signal will continue as long as there is proper hogged fuel flow conditions in the chute 10. The charged value of the capacitor C1 is then compared to a predetermined voltage value which we shall call A.C. level setpoint which is field-adjusted by potentiometer R1. The charged value in capacitor C1 and the A.C. level setpoint is compared in an A.C. level comparator 48. As long as the voltage value of the capacitor C1 is greater than the A.C. level setpoint, the output of comparator 48 is a negative voltage or a logic ZERO signal indicating proper hogged fuel flow. If the voltage value of capacitor C1 discharges below the A.C. level setpoint, the output of comparator 48 becomes a positive value or a logic ONE signal, indicating a chute 10 blockage condition. The logic output of comparator 48 is then applied to two AND gates, 50 and 52 along a line 49. When the output of the comparator 48 is a logic ZERO signal indicating proper hogged fuel flow, both AND gates 50 and 52 are disabled since AND gates require all One logic signals to be active. If the comparator 48 level is a logic ONE, AND gates 50 and 52 now are enabled.

Before continuing with the operation of AND gates 50 and 52 let us now go back to the D.C. portion of the circuit to pick up the other inputs to the AND gates 50 and 52. Under normal hogged fuel flow conditions, the flickering or A.C. output of detector 42 as amplified by amplifier 44 is inputed also to a D.C. level comparator 56 which also has a D.C. level setpoint produced from rheostat 54. This D.C. level setpoint 54 is compared in the D.C. level comparator 56. Depending on the absolute intensity of the light received by the detector 42, the output of comparator 56 can be positive when the reflected light from source 34 is greater than the D.C. level setpoint, which would be corresponding to a logic ONE signal, or the output can be negative when the light intensity is below the D.C. level setpoint. This later condition would be a logic ZERO signal.

When the output of comparator 56 is a logic ONE, meaning that the light is brighter than the D.C. level setpoint, a logic ONE signal will be applied to AND gate 50 along line 51. The same logic ONE signal is applied to an inverter 58 along line 53 giving an output of logic ZERO to AND gate 52, disabling AND gate 52.

As was mentioned earlier, under normal hogged fuel flow conditions the output of comparator 48 will be a logic ZERO signal. The net result from the inputs to AND gates 50 and 52 result in AND gate 50 establishing a logic ZERO signal and AND gate 52 also establishing a logic ZERO signal. Thus both lines 30 and 32 have no control signal established on them during normal hogged fuel flow conditions which would actuate alarms or turn off motors 18 or 24. The output of AND gate 50, logic ZERO, is transmitted to OR gate 60 along line 59 where the signal will have no effect on the OR gate 60. The output of AND gate 52, logic ZERO, is transmitted along line 61 to an inverter 62 where the signal will be inverted to a logic ONE signal and transmitted to an AND gate 64 along line 63. Under normal hogged fuel flow conditions, AND gate 64 is ANDED with the input from an oscillator 70 through an OR gate 66 as well as the output of the inverter 62. Under the forementioned conditions the output from AND gate 64 will change state at a rate equal to the oscillator 70 since all inputs are ONE with the exception of the oscillator 70 which varies between logic ONE and ZERO. This changing state of the oscillator 70 will cause the AND gate 64 to drive a remote indicator light 65 through an output amplifier 68, turning the light 65 connected to the line 28 on and off at a rate equal to the frequency of the oscillator 70. Thus as may be seen from the foregoing under normal flow conditions the light 65 is flickering and no control signals are transmitted along central lines 30 and 32.

Turning next to the case where the light source 34 is blocked from the detector 42 by a chute packed with hogged fuel, whenever a downstream blockage occurs, the detector 42 will produce a low or ZERO D.C. output since there is no light reaching the detector 42. The amplifier 44 will tend to gain this low or ZERO signal but will be unable to amplify it higher than the D.C. level setpoint from the resistor 54. Downstream blockage will thus produce a logic ZERO on the output of comparator 56 which ZERO signal is transmitted along line 51 to disable AND gate 50. The ZERO signal from comparator 56 will also be inverted in the inverter 58 to a logic ONE and applied to AND gate 52. Under downstream blockage conditions, the output of the A.C. amplifier 46 is a logic ONE signal, since there is no A.C. component in the ZERO signal. When there is no signal at the A.C. amplifier 46 outlet, the capacitor C1 will discharge below the A.C. level setpoint set by R1 and will produce a logic ONE signal in the A.C. level comparator 48. The logic ONE signal from comparator 48 is added with the logic ONE from the inverter 58 and the result of AND gate 52 becomes a logic ONE signal established along line 32 which may be used to trigger an alarm or stop motor 24. This logic ONE signal from AND gate 52 will also go through inverter 62 becoming a logic ZERO signal disabling AND gate 64. When AND gate 64 is disabled, the result of AND gate 64 will be a logic ZERO, turning off the remote light 65. Thus we see that under downstream blockage conditions the light 65 is turned off and a control signal is established on line 32 only which signal may be used to sound an alarm or turn off motor 24.

Under the condition where there is an upstream blockage, the light from source 34 as detected by the detector 42 will be a very high continuous light since there is no hogged fuel blocking the chute in the window area. This continuous light will produce a constant level output from detector 42. The continuous output from detector 42 is amplified in the amplifier 44 and applied to the D.C. level comparator 56. The signal from comparator 56 will be much higher than the D.C. level setpoint from resistor 54 which will produce a logic ONE signal on the output of comparator 56. This logic ONE signal enables AND gate 50 and is inverted by inverter 58 disabling AND gate 52. Once again since there is no flickering or A.C. component for A.C. amplifier 46 the A.C. level comparator 48 will produce a logic ONE signal at its output. The logic ONE signal from the A.C. level comparator 48 and the logic ONE signal from the D.C. level comparator 56 will produce a logic ONE on the output of AND gate 50 establishing a control signal along line 30 which may be used to sound an alarm or shut off motor 18. This logic ONE signal from gate 50 will also enable the OR gate 60. The logic ONE at the input of OR gate 60 overrides the effect of the oscillator 70 and will produce a constant ONE signal at the AND gate 64. The AND gate 52 is disabled by the inverted logic ONE signal from the comparator 56 resulting in a logic ZERO signal output. This logic ZERO signal is applied to inverter 62 and the result of this inverter is a logic ONE signal to AND gate 64. At AND gate 64 we thus have a logic ONE signal at both inputs and the output of AND gate 64 becomes a logic ONE signal. This logic ONE signal will turn the remote light 65 on continuously. We thus see that under upstream blockage conditions the light 65 is continuously lit and a control signal is only applied along line 30 and not along line 32.

Certain modifications and improvements will occur to those skilled in the art upon reading this specification. It will be understood that all such improvements and modifications were deleted for the sake of conciseness and readability but are properly included in the scope of the following claims.

What we claim are:

1. An electrical circuit for establishing control signals in response to light signals comprising:
    a detector cell for establishing a first output signal in response to a flickering light source and a second output signal in response to a non-flickering light source; and
    circuit means, connected to said detector cell, for establishing an alternating control signal in response to said first output signal and a continuous control signal in response to said second output signal including a D.C. level comparator circuit for comparing the output signal from said detector cell with a D.C. reference signal and establishing either a logic ONE or a logic ZERO output signal therefrom depending upon the relative values of said output signal and said D.C. reference signal, an A.C. level comparator circuit for comparing the output signal from said detector cell with an A.C. reference signal and establishing either a logic ONE or a logic ZERO output signal therefrom depending upon the relative values of said output signal and said A.C. reference signal; and, logic gate means connected to said D.C. level comparator and to said A.C. level comparator for establishing control signals in response to various logic combinations from said A.C. and D.C. level comparators.

2. An electrical circuit as set forth in claim 1 including indicator means connected to said logic gate means for providing distinct outputs in response to distinct control signals from said logic gate means.

3. An electrical assembly for monitoring flow of particulate material in a chute comprising:
    a chute for directing the flow of particulate material therethrough having a pair of opposed window areas and a reflective bottom;
    a light source mounted at one of said opposed window areas for reflecting light from the reflective bottom of said chute to the other of said opposed window areas whenever said chute is free of particulate material in the area of the opposed windows; and
    light detecting circuit means mounted at the opposed window area of said chute for establishing a flickering output signal whenever particulate material is normally flowing in the window area of said chute and a steady state output signal whenever particulate material is not flowing in the window area of said chute.

4. An electrical assembly as set forth in claim 3 wherein said light detecting circuit means establishes a first control signal in response to the flickering output signal and a second or third control signal in response to the steady state output signal depending upon the value of the steady state output signal.

5. An electrical assembly as set forth in claim 4 wherein said light detecting circuit establishes a low level steady state output signal and said second control signal whenever the window area of said chute bottom is blocked with particulate material and a high level steady state output signal and said third control signal whenever said chute bottom is free of particulate material in the window area.

6. An electrical assembly as set forth in claim 5 including an indicator light connected to said light detecting circuit means for providing a flickering light signal in response to said first control signal, a no light condition in response to said second control signal and a continuous light condition in response to said third control signal.

7. An electrical assembly as set forth in claim 3 wherein said light detecting circuit means includes:
    a D.C. level comparator circuit for comparing the output signal from said detector cell with a D.C. reference signal and establishing either a logic ONE or a logic ZERO output signal therefrom depending upon the relative values of said output signal and said D.C. reference signal;
    an A.C. level comparator circuit for comparing the output signal from said detector cell with an A.C. reference signal and establishing either a logic ONE or a logic ZERO output signal therefrom depending upon the relative values of said output signal and said A.C. reference signal; and logic gate means connected to said D.C. level comparator and to said A.C. level comparator for establishing control signals in response to various logic combinations from said A.C. and D.C. level comparators.

8. An electrical circuit as set forth in claim 7 including indicator means connected to said logic gate means for providing distinct outputs in response to distinct control signals from said logic gate means.

* * * * *